(12) United States Patent
Chi-Hsueh

(10) Patent No.: US 10,507,444 B2
(45) Date of Patent: Dec. 17, 2019

(54) METHOD AND DEVICE FOR PRODUCING HONEYCOMB PARTICLE CAPABLE OF ABSORBING HARMFUL MOLECULAR ELEMENT

(71) Applicants: Richard Chi-Hsueh, San Diego, CA (US); Chung-Yeh Hsu, New Taipei OT (TW)

(72) Inventor: Richard Chi-Hsueh, San Diego, CA (US)

(73) Assignees: Richard Chi-Hsueh, San Diego, CA (US); Chung-Yeh Hsu, New Tiapei (TW)

( * ) Notice: Subject to any disclaimer, the term of this patent is extended or adjusted under 35 U.S.C. 154(b) by 227 days.

(21) Appl. No.: 15/696,696

(22) Filed: Sep. 6, 2017

(65) Prior Publication Data

US 2018/0147550 A1    May 31, 2018

Related U.S. Application Data

(60) Provisional application No. 62/426,607, filed on Nov. 28, 2016.

(51) Int. Cl.

| | |
|---|---|
| *B01J 2/18* | (2006.01) |
| *B01J 20/30* | (2006.01) |
| *B01D 1/18* | (2006.01) |
| *B01J 2/06* | (2006.01) |
| *B01J 20/284* | (2006.01) |
| *B01J 20/282* | (2006.01) |

(52) U.S. Cl.
CPC ............. *B01J 2/18* (2013.01); *B01D 1/18* (2013.01); *B01J 2/06* (2013.01); *B01J 20/3028* (2013.01); *B01J 20/282* (2013.01); *B01J 20/284* (2013.01)

(58) Field of Classification Search
None
See application file for complete search history.

(56) References Cited

U.S. PATENT DOCUMENTS

| | | | | |
|---|---|---|---|---|
| 4,613,371 | A * | 9/1986 | Cheney | ............. B22F 9/082 |
| | | | | 148/403 |
| 2007/0086935 | A1* | 4/2007 | Chen | ............. B01J 20/0207 |
| | | | | 423/210 |
| 2017/0225094 | A1* | 8/2017 | Ju | ............. C02F 1/302 |

* cited by examiner

*Primary Examiner* — Mary Lynn F Theisen
(74) *Attorney, Agent, or Firm* — Rosenberg, Klein & Lee

(57) ABSTRACT

A method and a device for producing honeycomb particles capable of absorbing harmful molecular elements are disclosed. A chemical element having a crystal structure is dissolved in water in a certain percentage to form a chemical element solution, and then it is pressurized. The pressurized chemical element solution is sprayed out in mist form toward a forming mirror by a high-pressure nozzle of a spray tube. When the chemical element solution in mist form contacts the heated forming mirror, the moisture quickly bursts and evaporates to form fine particles. The dried fine particles of the chemical element are made to fall by the high frequency vibration and are collected. Accordingly, the chemical element having a crystal structure is formed into fine particles having many air holes, increasing the area for chemical reaction and further increasing the efficiency of absorption of harmful elements such as various toxic elements or bacteria.

8 Claims, 4 Drawing Sheets

METHOD AND DEVICE FOR PRODUCING HONEYCOMB PARTICLE CAPABLE OF ABSORBING HARMFUL MOLECULAR ELEMENT

REFERENCE TO RELATED APPLICATION

This Application is based on Provisional Application Ser. No. 62/426,607, filed 28 Nov. 2016.

BACKGROUND OF THE INVENTION

Field of the Invention

The present invention relates to a method and a device for producing honeycomb particles capable of absorbing harmful molecular elements. More particularly, by a method and a device for producing honeycomb particles capable of absorbing harmful molecular elements of the present invention, the chemical element having a crystal structure is formed into fine particles having many air holes, increasing the area for chemical reaction with various harmful elements, further increasing the efficiency of absorption of harmful elements such as various toxic elements or bacteria, and increasing the utility.

Description of Related Art

A chemical element with a crystal structure has many crystal planes in every block, every particle, or every crystal. Each crystal plane of a polyhedral crystal is a smooth mirror structure. When a first chemical element having a crystal structure, whether formed of small blocks or small particles, comes in contact with a second chemical element in a gas state, few chemical reactions are produced on the smooth mirror structure of the first chemical element having the crystal structure. Instead, the majority of the second chemical element in the gas state simply flows past the crystal planes of the first chemical element, without producing the chemical reaction. In other words, the efficiency of chemical reaction between the first chemical element having the crystal structure and the second chemical element in the gas state is very low.

There are many contaminants in air, such as dust and other airborne particles which are referred to as particulate matter (PM). The particle sizes of the particulate matter vary. Particulate matter with a diameter of 2.5 µm or less is called PM2.5, also known as airborne fine particles, and is measured in µg/m$^3$. The diameter of PM2.5 is less than 1/28 of that of a human hair, and due to its small size it is able to pass into the alveoli and directly into the human blood circulation. Therefore, the effect on humans and the ecology caused by PM2.5 cannot be ignored. Recently, the impact of PM2.5 on human health has established by many epidemiological studies, and includes effects on bronchitis, asthma, cardiovascular diseases, and lung cancer. Whether in the long term or in the short term, exposure to an environment having air contaminants increases the risk of death and of respiratory disease.

SUMMARY OF THE INVENTION

Accordingly, the object of the present invention is to provide a method and a device for producing honeycomb particles capable of absorbing harmful molecular elements, wherein a chemical element having a crystal structure is formed into fine particles having many air holes, increasing the area for chemical reaction with various harmful elements, further increasing the efficiency of absorption of harmful elements such as various toxic elements or bacteria, and increasing the utility.

For the above object, a device for producing honeycomb particles capable of absorbing harmful molecular elements comprises a body and at least one spray tube.

The body is formed with a forming mirror extending upward therefrom, and a high frequency generator and a heater are set on the forming mirror. The forming mirror is driven by the high frequency generator to generate high frequency vibration, and the forming mirror is heated by the heater. Moreover, a collection tank is formed on the body and set below the forming mirror.

The spray tube is set and corresponded to the forming mirror of the body and is connected with a nozzle at the top end thereof facing to the forming mirror. The spray tube is connected to a high pressure generator via a hydraulic pipe, and the high pressure generator is connected with a motor, which is connected to a solution tank via a conveying pipe.

According to an embodiment of the present invention, the forming mirror is made of metal material.

According to an embodiment of the present invention, the forming mirror has a semi-circular arc shape.

According to an embodiment of the present invention, the forming mirror is heated to 80° C.-240° C. by the heater.

For the above object, a method for producing honeycomb particles capable of absorbing harmful molecular elements is disclosed, comprising the following steps. A chemical element having a crystal structure is dissolved in water in a certain percentage to form a chemical element solution, and then the chemical element solution is pressurized. The pressurized chemical element solution is delivered to a spray tube via a hydraulic tube, making the pressurized chemical element solution into a mist form to spray toward a heated forming mirror, which is under a high frequency vibration. When the chemical element solution in mist form contacts the heated forming mirror, the moisture quickly bursts and evaporates to form fine particles. The dried fine particles of the chemical element are made to fall by the high frequency vibration and are collected.

According to an embodiment of the present invention, the forming mirror is made of metal material.

According to an embodiment of the present invention, the forming mirror has a semi-circular arc shape.

According to an embodiment of the present invention, the forming mirror is heated to 80° C.-240° C. by the heater.

DETAILED DESCRIPTION OF THE PREFERRED EMBODIMENT

Figure 1:
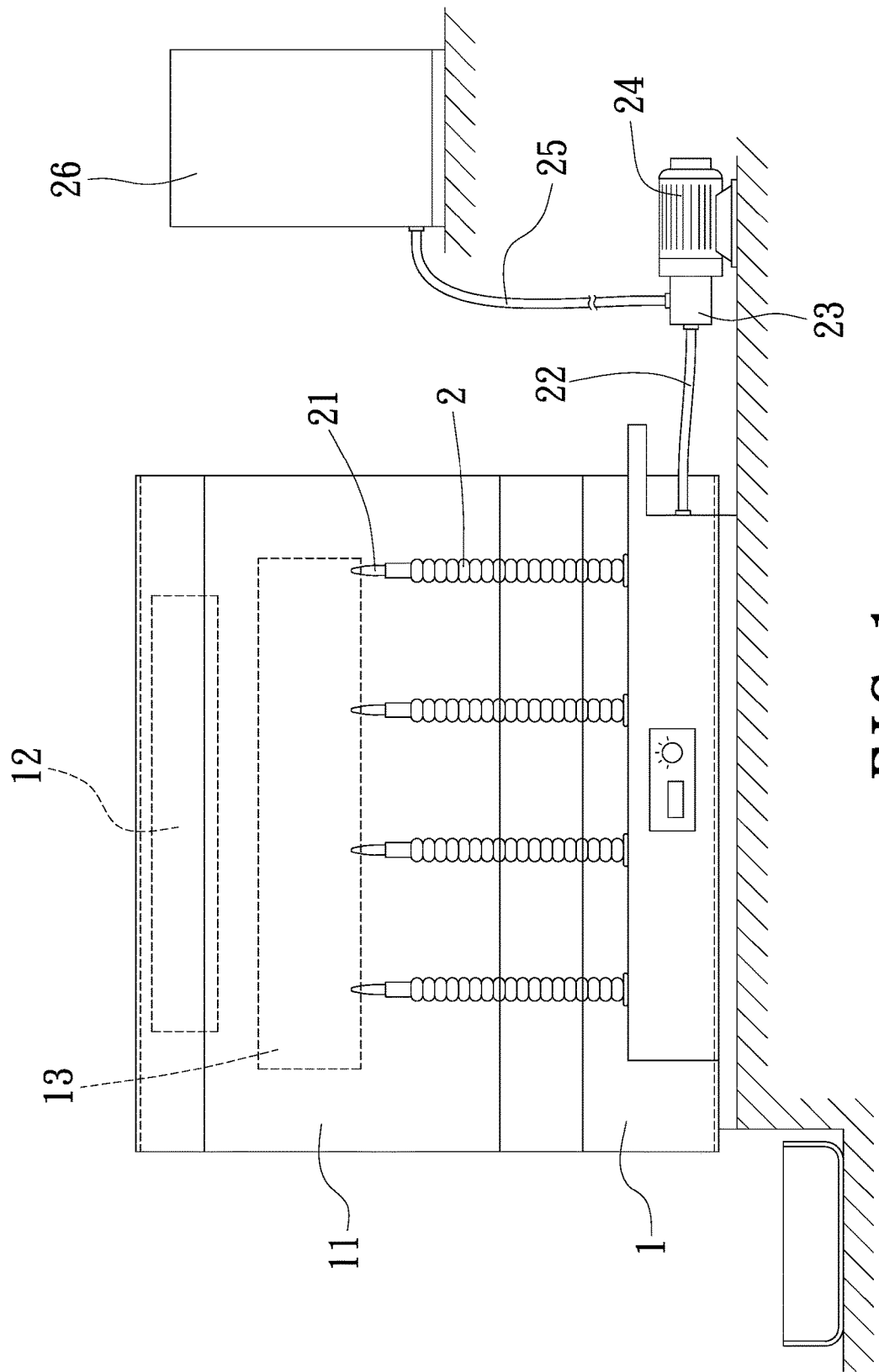
FIG. 1 is a front view of a device for producing honeycomb particles capable of absorbing harmful molecular elements, according to an embodiment of the present invention.
Figure 2:
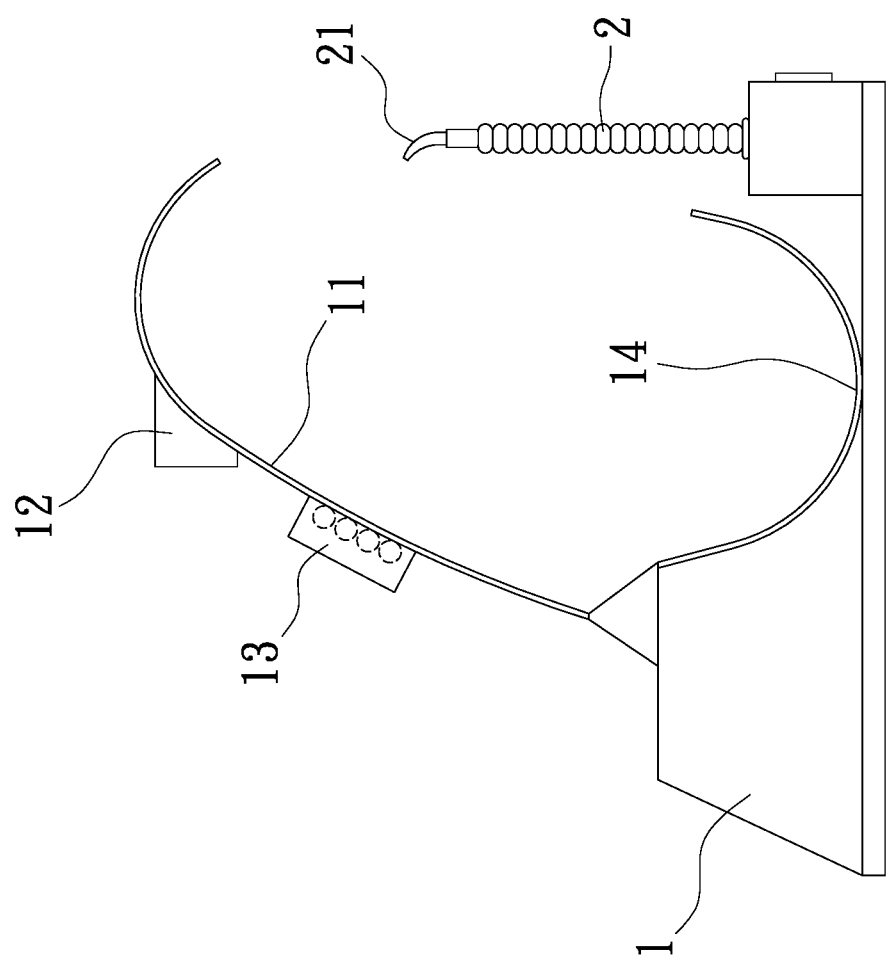
FIG. 2 is a side view of a device for producing honeycomb particles capable of absorbing harmful molecular elements, according to an embodiment of the present invention.

Please refer to FIG. 1 and FIG. 2, which are a front view and a side view of a device for producing honeycomb particles capable of absorbing harmful molecular elements, according to an embodiment of the present invention. The device for producing honeycomb particles capable of absorbing harmful molecular elements comprises a body 1 and at least one spray tube 2.

The body 1 is formed with a forming mirror 11 extending upward therefrom. The forming mirror 11 is made of metal material and has a semi-circular arc shape. A high frequency generator 12 and a heater 13 are set on the forming mirror 11. The forming mirror 11 is driven by the high frequency generator 12 to generate high frequency vibration, and the forming mirror 11 is heated to 80° C.-240° C. by the heater 13. Moreover, a collection tank 14 is formed on the body 1 and set below the forming mirror 11.

The spray tube 2 is set and corresponded to the forming mirror 11 of the body 1 and is connected with a nozzle 21 at the top end thereof, and the nozzle 21 is pointed toward the forming mirror 11. The spray tube 2 is connected to a high pressure generator 23 via a hydraulic pipe 22, and the high pressure generator 23 is connected with a motor 24, which is connected to a solution tank 26 via a conveying pipe 25.

Figure 3:
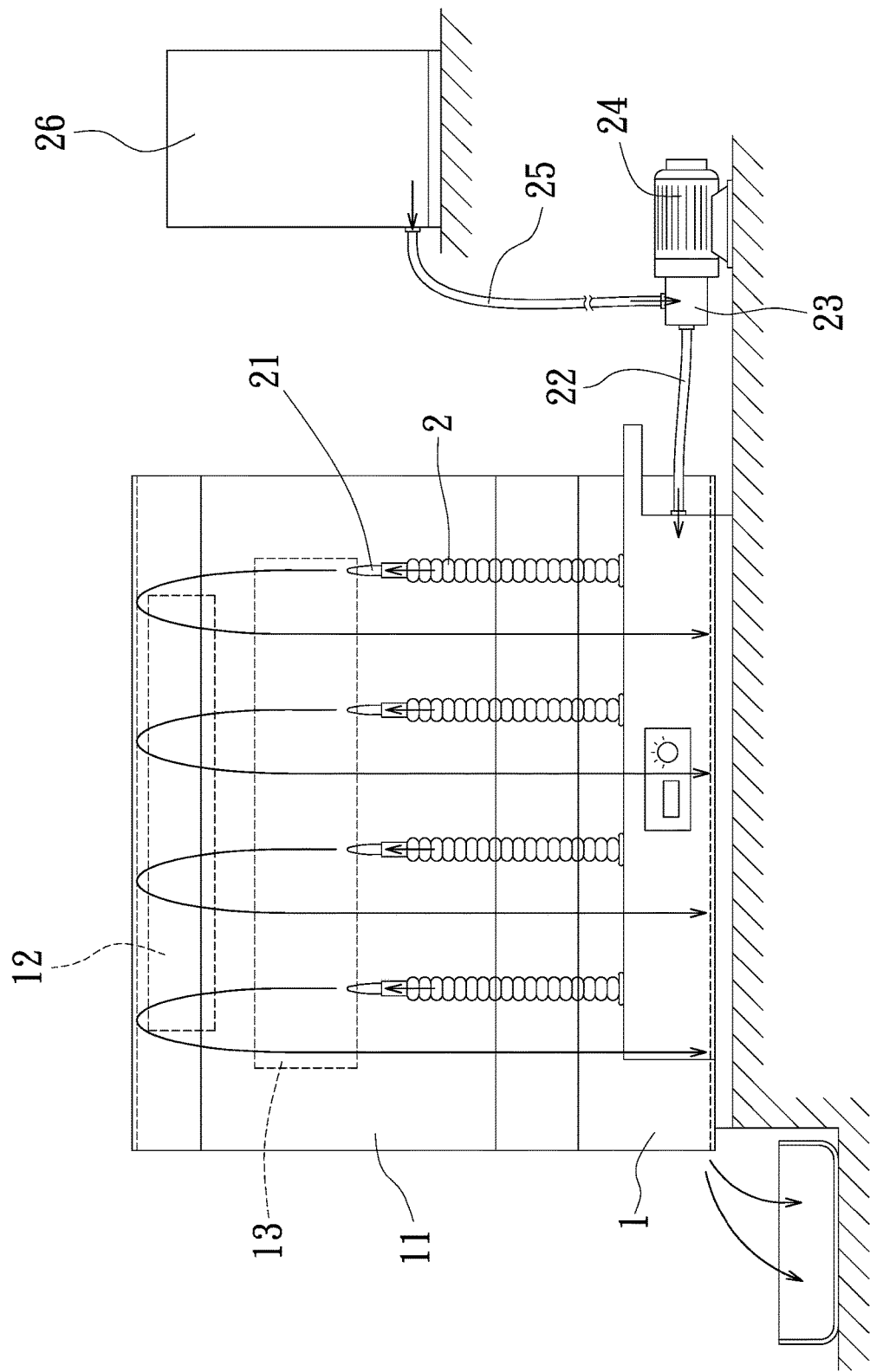
FIG. 3 is a front view of a device for producing honeycomb particles capable of absorbing harmful molecular elements, with the device in a use state, according to an embodiment of the present invention.
Figure 4:
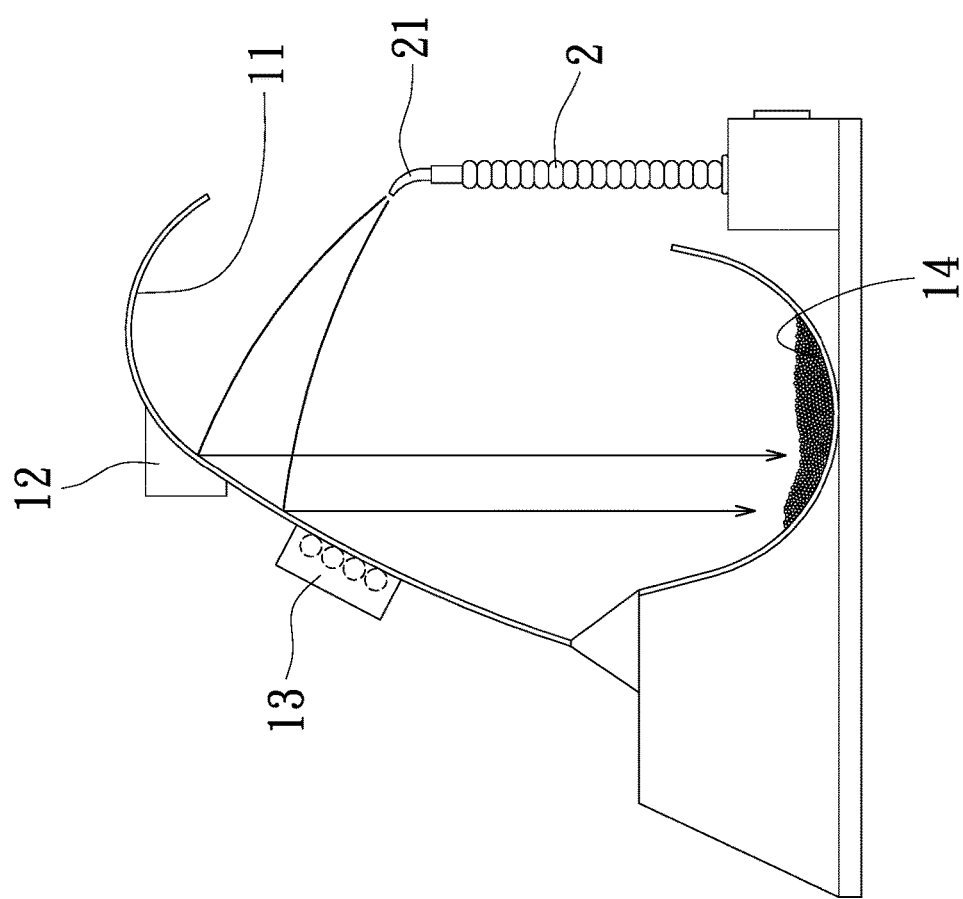
FIG. 4 is a side view of a device for producing honeycomb particles capable of absorbing harmful molecular elements, with the device in a use state, according to an embodiment of the present invention.

Please refer to FIG. 3 and FIG. 4, which are a front view and a side view of a device for producing honeycomb particles capable of absorbing harmful molecular elements, with the device in a use state, according to an embodiment of the present invention. When the device of the present invention is operated, a chemical element having a crystal structure is dissolved in water in a certain percentage to form a chemical element solution, and it is stored in the solution tank 26. Then, the motor 24 and the high pressure generator 23 are started, making the chemical element solution stored in the solution tank 26 pump into the high pressure generator 23 via the conveying pipe 25 by the motor 24 to pressurize. After the chemical element solution is pressurized by the high pressure generator 23, it is delivered to the spray tube 2 via the hydraulic pipe 22. Meanwhile, the forming mirror 11 of the body 1 is driven by the high frequency generator 12 to generate high frequency vibration, and is heated to 80° C.-240° C. by the heater 13. The pressurized chemical element solution is made into a mist form to spray toward a heated forming mirror 11 via the nozzle 21 of the spray tube 2. When the chemical element solution in mist form contacts the heated forming mirror 11, the moisture quickly bursts and evaporates to form fine particles. Then, the dried fine particles of the chemical element fall down into the collection tank 14 and are collected because the forming mirror 11 is under high frequency vibration.

Because the moisture in the fine particles of the chemical element quickly bursts and evaporates under high temperature, the crystal structure of the fine particles of the chemical element collected in the collection tank 14 has been destroyed and many air holes are formed in the fine particles of the chemical element. Therefore, the chemical reaction area which reacts with the harmful elements is increased due to the many air holes in the fine particle of the chemical element, increasing the efficiency of absorption of the various toxic elements and bacteria.

In a preferred use of the device and method of the present invention, alum is used. The alum is dissolved in the water in a certain percentage to form an alum solution, and the alum solution is pumped into the high pressure generator 23 via the conveying pipe 25 to be pressurized. Then the pressurized alum solution is delivered to the spray tube 2 via the hydraulic pipe 22, and is sprayed in the mist form toward the forming mirror 11 via the nozzle 21 of the spray tube 2. The moisture in the alum solution quickly bursts and evaporates to form fine particles on contact with the heated forming mirror 11, and the dried fine particles of the alum having many air holes fall down into the collection tank 14 due to high frequency vibration of the forming mirror 11. The fine particles of alum are used in various masks or filtration equipment for absorbing harmful elements such as various toxic elements and bacteria in PM2.5. Furthermore, the fine particles of alum are mixed into turbid water in order to absorb the impurities in the water, achieving the effect of water purification.

According to the above description and embodiments, in comparison with previous methods and devices, in the device and method for producing honeycomb particles capable of absorbing harmful molecular elements of the present invention, the chemical element having a crystal structure is formed into fine particles having many air holes, increasing the area for chemical reaction with various harmful elements, further increasing the efficiency of absorption of harmful elements such as various toxic elements or bacteria, and increasing the utility.

What is claimed is:

1. A device for producing honeycomb particle capable of absorbing harmful molecular element, comprising:
    a body, comprising:
        a forming mirror, upwardly extending from the body;
        a high frequency generator, set on the forming mirror, wherein the forming mirror is driven by the high frequency generator to generate high frequency vibration;
        a heater, set on the forming mirror for heating the forming mirror; and
        a collection tank, formed on the body and set below the forming mirror; and
    at least one spray tube, corresponding to the forming mirror of the body and connected with a nozzle at the top end thereof, which nozzle faces to the forming mirror, wherein the spray tube is connected to a high pressure generator via a hydraulic pipe and the high pressure generator is connected with a motor, which is connected to a solution tank via a conveying pipe.

2. The device according to claim 1, wherein the forming mirror is made of metal material.

3. The device according to claim 1, wherein the forming mirror is semi-circular arc shape.

4. The device according to claim 1, wherein the forming mirror is heated to 80° C.-240° C. by the heater.

5. A method for producing honeycomb particle capable of absorbing harmful molecular element, comprising the step of:
    dissolving a certain percentage of a chemical element having crystal structure in water to form a chemical element solution;
    pressurizing the chemical element solution;
    delivering the pressurized chemical element solution to a spray tube via a hydraulic tube;
    making the pressurized chemical element solution into a mist form to spray toward a heated forming mirror, which is under a high frequency vibration, thereby quickly bursting and evaporating the moisture to form fine particle when the chemical element solution in mist form is contacted with the heated forming mirror; and falling down the dried fine particle of the chemical element through the high frequency vibration and collecting it.

6. The method according to claim 5, wherein the forming mirror is made of metal material.

7. The method according to claim 5, wherein the forming mirror is semi-circular arc shape.

8. The method according to claim 5, wherein the forming mirror is heated to 80° C.-240° C. by the heater.

* * * * *